T. HAND.
BOLT.
APPLICATION FILED NOV. 19, 1915.
1,208,550.
Patented Dec. 12, 1916.
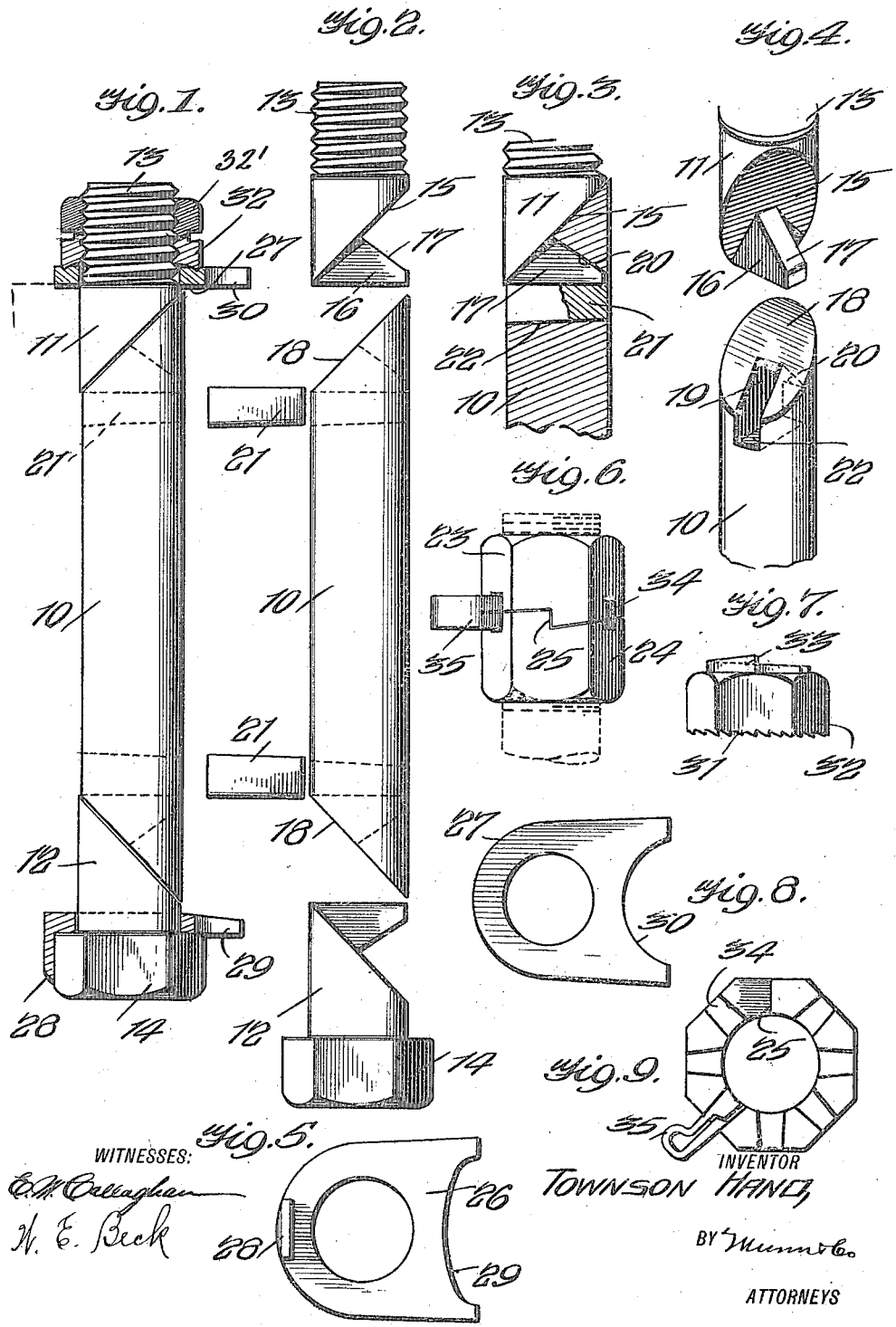
WITNESSES:
INVENTOR
TOWNSON HAND,
BY Munn & Co.
ATTORNEYS

UNITED STATES PATENT OFFICE.

TOWNSON HAND, OF NEW HAVEN, CONNECTICUT.

BOLT.

1,208,550.  Specification of Letters Patent.  Patented Dec. 12, 1916.

Application filed November 19, 1915. Serial No. 62,413.

*To all whom it may concern:*

Be it known that I, TOWNSON HAND, a citizen of the United States, and a resident of New Haven, in the county of New Haven and State of Connecticut, have invented an Improvement in Bolts, of which the following is a specification.

This invention is an improvement in railroad track appliances and has particular reference to a locking bolt used in connection with railroad frogs.

An object of the invention is the provision of a bolt consisting of a main section, and end sections connected thereto in a novel manner whereby said end sections are adjusted laterally relative to the main section when the bolt is being fastened so that said end sections will bind against the wall of the bolt opening and thus securely retain said bolt in locking position.

Another object is the provision of a novel construction of nut lock designed to be used in connection with the bolt which will also assist in securely retaining the latter in locked position.

A further object is to provide a bolt of this character which is simple in construction, easy to manufacture, and effective in carrying out the purpose for which it is designed.

The inventive idea involved is capable of receiving a variety of mechanical expressions, one of which, for the purpose of illustrating the invention, is shown in the accompanying drawing, in which—

Figure 1 is a view of the bolt in locked position, part of the locking means being shown in section. Fig. 2 is a similar view of the parts of the bolt detached from each other. Fig. 3 is a partial section showing the manner of interlocking one of the end sections with the main section of the bolt. Fig. 4 is a detailed perspective view of the interlocking joint between one end of the main section and one of the end sections. Fig. 5 is a plan view of one of the washers used in connection with the bolt when in locked position. Fig. 6 is a side elevation of one form of lock nut used in connection with the bolt. Fig. 7 is a side elevation of a locking nut used in connection with another form of lock nut. Fig. 8 is a plan view of another washer used in connection with the lock nut. Fig. 9 is a view of the locking washer showing the manner of locking the same to the bolt.

Referring to the drawings and more particularly to Figs. 1 to 4 inclusive, the numeral 10 indicates the main section of a bolt having the end sections 11 and 12 detachably secured thereto in a manner which will presently appear. The section 11 is provided with the usual screw threads 13 to receive a locking device while the section 12 is provided with the usual bolt head 14.

The manner of connecting the end sections 11 and 12 with the main section 10 is similar in both instances and, therefore, a description of one will suffice for both. Each of the end sections is provided upon its inner end with an inclined surface 15, preferably machined, having extending laterally therefrom a locking lug 16 having an inclined surface 17 coöperating with the inclined surface 15 to form a substantially V-shaped notch as shown in Fig. 2. The opposite ends of the main section 10 of the bolt are inclined or beveled in opposite directions as indicated at 18 and each end is cut away to provide a lug receiving opening 19 having an inclined or beveled surface 20 adapted to be engaged by the inclined surface 17 of the lug 16.

To lock the bolt in position the sections of said bolt are assembled and inserted into the bolt opening and the lock nut threaded upon the end 13 of the end section 11. Upon tightening the lock nut the inclined surfaces 17 and 20 will contact and by reason of their inclination the end sections 11 and 12 and main section 10 will have lateral movement relative to each other in a diagonal direction, thus causing said end sections to bind against the wall of the bolt opening. The wedge-shaped keys 21 are employed for the purpose of insertion into the inner portion 22 of the openings 19 in the main section 10 and the inclined edge of the keys 21 will engage the bottom of the lug 16 whereby to further bind the inclined surfaces 17 and 20 together and retain the end sections in adjusted positions relative to the main section.

In Fig. 6 there is illustrated one form of nut lock which may be employed in connection with the invention and which consists of a pair of superimposed nuts 23 and 24 having adjacent faces thereof provided with interlocking teeth 25 whereby turning of the nuts on the bolt is prevented after the same is locked. Locking washers 26 and 27 may also be employed, the former being adapted to receive the end section 12 and provided with a lug 28 for engagement with the head 14 of the section 12 while one edge of the washer is cut away as indicated at 29 whereby said edge will effectively engage the rail when the bolt and other parts are in position in the frog. The washer 27 is similarly cut away as indicated at 30 and is adapted to be mounted upon the end section 11, as shown in Fig. 1. This washer is preferably made of soft metal whereby the concaved serrated face 31 of the locking nut 32 will effectively bite into the same. This nut 32 is adapted to be threaded upon the section 11 and is provided on its opposite face with an inclined portion 33 which coöperates with a similarly shaped face of a nut 32' constructed in a like manner to the nut 23. This latter nut is adapted to be also threaded upon the section 11 and engage the locking nut 32 so as to effectively form a locking device which will prevent the bolt from becoming displaced.

In the embodiment shown in Fig. 6 and also that shown in Fig. 1 the engaging faces of the nuts 23, 24, 32 and 32' are provided with a plurality of outwardly tapering key ways 34 which are adapted to receive a spring key 35, the members of which when inserted into any one of the key ways and released, will spread apart so that relative movement between the nuts will be prevented. The key 35 may be removed and the nut lock detached from the bolt should it be desired to replace the latter.

What is claimed is:

A nut lock comprising a bolt, a washer mounted thereon and formed of relatively soft material, a nut also mounted on the bolt and provided with a concaved serrated face, the teeth of which embed in said washer when the nut is threaded thereagainst, another face of said nut being provided with an inclined locking surface, a second nut having a similar surface mounted upon said bolt adapted for engagement with the inclined surface of the first-named nut, said nut having outwardly converging and registering key-ways in the sides thereof, and spring keys engaging in said key-ways for locking said nuts together.

TOWNSON HAND.

Witnesses:
WILLIAM N. GOODMAN,
JOHN B. SULLIVAN.

Copies of this patent may be obtained for five cents each, by addressing the "Commissioner of Patents, Washington, D. C."